United States Patent
Wu et al.

(10) Patent No.: US 12,411,076 B2
(45) Date of Patent: Sep. 9, 2025

(54) STRESS AND SHOCK WAVE DIAGNOSIS FUSED LIBS OPTIMIZATION SYSTEM AND METHOD

(71) Applicant: XI'AN JIAOTONG UNIVERSITY, Shaanxi (CN)

(72) Inventors: Jian Wu, Shaanxi (CN); Ying Zhou, Shaanxi (CN); Zhi Zhang, Shaanxi (CN); Mingxin Shi, Shaanxi (CN); Yan Qiu, Shaanxi (CN); Xingwen Li, Shaanxi (CN); Yuhua Hang, Shaanxi (CN); Cuixiang Pei, Shaanxi (CN)

(73) Assignee: XI'AN JIAOTONG UNIVERSITY, Shaanxi (CN)

( * ) Notice: Subject to any disclaimer, the term of this patent is extended or adjusted under 35 U.S.C. 154(b) by 174 days.

(21) Appl. No.: 18/476,299

(22) Filed: Sep. 27, 2023

(65) Prior Publication Data

US 2024/0053257 A1    Feb. 15, 2024

Related U.S. Application Data

(63) Continuation of application No. PCT/CN2022/110506, filed on Aug. 5, 2022.

(30) Foreign Application Priority Data

Jul. 29, 2022    (CN) .......................... 202210912279.5

(51) Int. Cl.
    *G01N 21/17* (2006.01)
    *G01N 21/31* (2006.01)

(52) U.S. Cl.
    CPC ......... *G01N 21/1702* (2013.01); *G01N 21/31* (2013.01); *G01N 2021/1706* (2013.01)

(58) Field of Classification Search
    None
    See application file for complete search history.

(56) References Cited

U.S. PATENT DOCUMENTS

| 7,679,743 B1 | 3/2010 | Jung et al. |
| 7,770,454 B2 * | 8/2010 | Sokol ................. G01N 29/2412 73/842 |

(Continued)

FOREIGN PATENT DOCUMENTS

| CN | 101788487 A | 7/2010 |
| CN | 105241849 A | 1/2016 |

(Continued)

OTHER PUBLICATIONS

International Search Report dated Dec. 29, 2022 in International Application No. PCT/CN2022/110506. English translation attached.

(Continued)

*Primary Examiner* — Suman K Nath

(57) ABSTRACT

The present disclosure discloses a stress and shock wave diagnosis fused LIBS optimization system and method, including: collecting a shock wave signal, a stress wave signal and a spectral signal of a detected object subjected to pulsed laser ablation under the current parameter; pre-processing the spectral signal to obtain a spectral intensity of the detected object under the current parameter; processing the shock wave signal and the stress wave signal to obtain a shock wave intensity and a stress wave intensity under the current parameter; adjusting optimization variables until optimization measurement and diagnosis of a spectral enhancement measure or system parameter are completed. Information on other two dimensions is added for an optimization process; and proportions of shock wave propagation in incident laser energy and mechanical stress propagation in a target can be intuitively recognized, so that the (Continued)

scientificity and persuasiveness of an optimization result are improved.

7 Claims, 5 Drawing Sheets

(56) References Cited

U.S. PATENT DOCUMENTS

| | | | |
|---|---|---|---|
| 9,816,934 B2* | 11/2017 | Li | ........................ G01N 21/718 |
| 9,952,159 B2* | 4/2018 | Wang | ................... G01N 21/718 |
| 2004/0040379 A1 | 3/2004 | O'Donnell et al. | |
| 2005/0120803 A1 | 6/2005 | Sokol et al. | |
| 2017/0045459 A1 | 2/2017 | Wang et al. | |
| 2017/0219494 A1 | 8/2017 | Li et al. | |

FOREIGN PATENT DOCUMENTS

| | | |
|---|---|---|
| CN | 107561004 A | 1/2018 |
| CN | 109990829 A | 7/2019 |
| CN | 113216921 A | 8/2021 |

OTHER PUBLICATIONS

Zhang, Lei "Research on Parameters Optimization of Laser-Induced Breakdown Spectroscopy Based Experimental Device." Spectroscopy and Spectral Analysis, vol. 31, No. 9,, Sep. 30, 2011 (Sep. 30, 2011), ISSN: 1000-0593 pp. 2355-2360.

Grant Notice dated Jun. 5, 2024 received in corresponding patent family application No. CN202210912279.5. English translation attached.

Lü Qishen et al. "Parameters of Laser-induced Breakdown Spectroscopy System Using Fiber-optic Transmission Laser", High Voltage Engineering, Issue 09, Sep. 30, 2020, full text.

* cited by examiner

STRESS AND SHOCK WAVE DIAGNOSIS FUSED LIBS OPTIMIZATION SYSTEM AND METHOD

CROSS-REFERENCE TO RELATED APPLICATIONS

This application is a continuation of International Application No. PCT/CN2022/110506 filed on Aug. 5, 2022, which claims a priority to Chinese Application No. CN202210912279.5 filed on Jul. 29, 2022, the entire disclosure of which is incorporated herein by reference.

TECHNICAL FIELD

The present disclosure belongs to the technical field of laser diagnosis, in particular relates to a stress and shock wave diagnosis fused LIBS optimization system and method.

BACKGROUND

Laser-induced breakdown spectroscopy (LIBS for short hereinafter) is a multielement analysis technology based on plasma emission spectroscopy. High-power pulsed laser emission is focused on a surface of a sample, which can make the laser irradiance near an ablation point on the surface reach the order of ~GW/cm$^2$. Parts of targets are heated rapidly, and then are melted, gasified and ionized to form plasmas, then, plasma radiation light is collected by using a spectrometer, and thus, types and contents of elements in the sample are analyzed qualitatively or quantitatively. Due to advantages such as no/only simple sample preparation, almost no destruction of the targets in a test process, and simultaneous rapid measurement of a plurality of elements, LIBS has become one of most promising detection means, and has been widely applied in the fields such as iron and steel detection, soil pollution, archaeological excavation, flaw detection for devices in nuclear power plants and radioactive material analysis.

At present, enhancement effects of various spectral enhancement technologies such as double-pulsed excitation, spatial constraint, and magnetic field constraint and an optimization process of a system parameter(such as pulse energy, wavelength, pulse width, interval, spot size, detection delay and integration time) often only depend on the effect characterization of a single spectral intensity, there is a lack of intuitive understanding for an enhancement mechanism, and therefore, volatility, randomness and blindness are caused. On the other hand, various diagnosis technologies that can characterize the enhancement and optimization mechanisms, such as conventional laser diagnosis technologies such as laser shadowing, schlieren, and interference, often need to add a strong continuous background laser or short pulse light source on the basis of an original LIBS system, which not only complicates an optical path structure and increases the debugging difficulty, but also has the risks of interfering with the spectral collection of the original system and failing to realize simultaneous detection. Another type of image diagnosis technology usually requires high-sensitivity imaging devices such as ICCD cameras, which are often very expensive and reach up to hundreds of thousands of yuan. Therefore, diagnosis technologies that ensure that the main test configuration of the LIBS system is not affected, can be performed simultaneously with the LIBS process, and are simple in structure, low in cost, and capable of guiding the optimization of a spectral enhancement measure and a system parameter are urgently needed to be integrated with LIBS technology.

SUMMARY

The present disclosure aims at providing a stress and shock wave diagnosis fused LIB optimization system and method for synchronously diagnosing and guiding an optimization process of a spectral enhancement measure and a system parameter of LIBS while satisfying requirements for simple structure, low cost and no interference with an original LIBS system in an engineering application. In the present disclosure, by adding diagnosis devices such as piezoelectric ultrasonic transducers and an oscilloscope, a spectral signal can be measured on the basis that the original LIBS measurement system is not changed, at the same time, a shock wave intensity in an environmental medium and a stress wave intensity propagating along a target surface can be detected, and optimization effects of the spectral enhancement measure and the system parameter on a spectral intensity in the early stage of LIBS analysis are helped to be diagnosed. In the present disclosure, the robustness and accuracy of a LIBS parameter optimization process are improved, and the blind debugging of the parameter is avoided.

In order to achieve the above-mentioned objectives, the present disclosure is implemented by adopting the following technical solutions:

in a first aspect, the present disclosure provides a stress and shock wave diagnosis fused LIBS optimization method, including the steps of:

collecting a shock wave signal, a stress wave signal and a spectral signal of a detected object subjected to pulsed laser ablation under the current parameter;

pre-processing the spectral signal to obtain a spectral intensity of the detected object under the current parameter;

processing the shock wave signal and the stress wave signal to obtain a shock wave intensity and a stress wave intensity under the current parameter; and adjusting optimization variables until optimization measurement and diagnosis of a spectral enhancement measure or system parameter are completed.

The above-mentioned method is further improved in that:

the step of collecting a shock wave signal, a stress wave signal and a spectral signal of a detected object subjected to pulsed laser ablation under the current parameter includes:

fixing a first piezoelectric ultrasonic transducer $A_1$ on a position, away from an ablation point for a distance x, over a target surface of the detected object, and laterally collecting a shock wave signal $\Phi_1$; fixing a second piezoelectric ultrasonic transducer $A_2$ on a position, away from the ablation point for a distance y, on the target surface, and measuring a stress wave signal $\Phi_2$ propagating along the target surface; then, connecting the first piezoelectric ultrasonic transducer $A_1$ and the second piezoelectric ultrasonic transducer $A_2$ to an oscilloscope, wherein x is a mounting distance of the first piezoelectric ultrasonic transducer $A_1$, and y is a mounting distance of the second piezoelectric ultrasonic transducer $A_2$; recording by the oscilloscope waveforms of the shock wave signal $\Phi_1$ and the stress wave signal $\Phi_2$ obtained after continuous N-pulse ablation under each parameter; and measuring a spectral signal $\Phi_3$ of a target element by a spectrometer.

The mounting distance x of the first piezoelectric ultrasonic transducer $A_1$ and the mounting distance y of the second piezoelectric ultrasonic transducer $A_2$ satisfy the following conditions:

the mounting distance x of the first piezoelectric ultrasonic transducer $A_1$ makes an actual measurement value thereof satisfy $L_1 \in (0.5ML_1, ML_1)$;

the mounting distance y of the second piezoelectric ultrasonic transducer $A_2$ makes an actual measurement value thereof satisfy $L_2 \in (0.5ML_2, ML_2)$;

wherein $ML_1$ is an upper limit of an available range of the first piezoelectric ultrasonic transducer $A_1$, and $ML_2$ is an upper limit of an available range of the second piezoelectric ultrasonic transducer $A_2$.

The step of pre-processing the spectral signal to obtain a spectral intensity of the detected object under the current parameter includes:

calculating a total peak intensity $E_{31,j}$, a net peak intensity $E_{32,j}$ and a net area intensity $E_{33,j}$ of the spectral signal $\Phi_3$; and calculating an average value of the total peak intensity $E_{31,j}$, the net peak intensity $E_{32,j}$ or the net area intensity $E_{33,j}$ as a spectral intensity index $E_3$ under the current parameter value:

$$E_3 = (\Sigma_{j=1}^{N} E_{3,j})/N$$

wherein $E_{3,j}$ is a spectral line intensity, measured under a $j^{th}$ pulse, of the target element.

The step of processing the shock wave signal and the stress wave signal to obtain a shock wave intensity and a stress wave intensity under the current parameter includes:

calculating a shock wave intensity $E_1$ under the current parameter:

$$E_1 = (\Sigma_{j=1}^{N} E_{1,j})/N$$

wherein $E_{1,j}$ represents a shock wave intensity under the $j^{th}$ pulse; and calculating a stress wave intensity $E_2$ under the current parameter:

$$E_2 = (\Sigma_{j=1}^{N} E_{2,j})/N$$

wherein $E_{2,j}$ represents a stress wave intensity under the $j^{th}$ pulse.

The shock wave intensity $E_{1,j}$ under the $j^{th}$ pulse is obtained according to the method of:

selecting, from a shock wave signal $\Phi_{1,j}$ measured under the $j^{th}$ pulse in continuous N pulses, an area where an appearing first peak is located as a subsequent shock wave analysis area $\Phi'[t]_{1,j}$, wherein j=1,2, . . . , N; firstly, subtracting a shock wave background baseline value $\Phi_{1B,j}$ from the shock wave analysis area $\Phi'[t]_{1,j}$, next, squaring the shock wave analysis area $\Phi'[t]_{1,j}$, and then, performing an integration on the shock wave analysis area $\Phi'[t]_{1,j}$ within a time range to obtain the shock wave intensity $E_{1,j}$ under the $j^{th}$ pulse; and the stress wave intensity $E_{2,j}$ under the $j^{th}$ pulse is obtained according to the method of:

selecting, from a stress wave signal $\Phi_{2,j}$ measured under the $j^{th}$ pulse in continuous N pulses, an area where an appearing first peak is located as a subsequent stress wave analysis area $\Phi'[t]_{2,j}$, wherein j=1,2, . . . , N; firstly, subtracting a stress wave background baseline value $\Phi_{2B,j}$ from the stress wave analysis area $\Phi'[t]_{2,j}$, next, squaring the stress wave analysis area $\Phi'[t]_{2,j}$, and then, performing an integration on the stress wave analysis area $\Phi'[t]_{2,j}$ within a time range to obtain the stress wave intensity $E_{2,j}$ under the $j^{th}$ pulse.

The step of adjusting optimization variables until optimization measurement and diagnosis of a spectral enhancement measure or system parameter are completed includes:

selecting an initial optimization interval [a, b] of an optimization variable A, wherein a is the minimum value of the optimization variable A, and b is the maximum value of the optimization variable A; uniformly setting a total of n groups of optimization values, then, setting a shock wave intensity measured in an $i^{th}$ test as $(E_1)_i$, setting a stress wave intensity measured in the $i^{th}$ test as $(E_2)_i$, setting a spectral intensity measured in the $i^{th}$ test as $(E_3)_i$ and setting a value $S_i$ of the optimization variable A in the $i^{th}$ test as:

$$S_i = a + (b-a) \times (i-1)/(n-1)$$

wherein i=1,2, . . . , n; and starting a test from i=1, if $(E_3)_2$ measured in a second test is greater than or equal to $(E_3)_1$ measured in a first test, $(E_1)_2 \geq (E_1)_1$, and at the same time, $(E_2)_2 \geq (E_2)_1$, further increasing i with a step length which is 1; or else, downwards or upwards replacing an optimization interval with [c, a] or [b, d], wherein c<a, and b<d; starting comparison again from i=1 until $(E_3)_{i+1}$ measured in an $(i+1)^{th}$ test is smaller than $(E_3)_i$ measured in the $i^{th}$ test, $(E_1)_{i+1} < (E_1)_i$, and at the same time, $(E_2)_{i+1} < (E_2)_i$, and then, determining $S_i$ set during the $i^{th}$ test as an optimal value of the optimization variable A.

In a second aspect, the present disclosure provides a stress and shock wave diagnosis fused LIBS optimization system, including:

A signal collection module configured to collect a shock wave signal, a stress wave signal and a spectral signal of a detected object subjected to pulsed laser ablation under the current parameter;

a spectral signal processing module configured to pre-process the spectral signal to obtain a spectral intensity of the detected object under the current parameter;

a shock and stress wave processing module configured to process the shock wave signal and the stress wave signal to obtain a shock wave intensity and a stress wave intensity under the current parameter; and a parameter adjustment module configured to adjust optimization variables until optimization measurement and diagnosis of a spectral enhancement measure or system parameter are completed.

Compared with the prior art, the present disclosure has the following beneficial effects.

According to the present disclosure, the robustness and accuracy of an optimization process of a spectral enhancement measure and a system parameter in the early stage of LIBS analysis are improved, and data fluctuation and randomness caused by a traditional optimization process which only depends on the effect characterization of a single spectral intensity can be reduced. By introducing shock wave measurement in an environmental medium and stress wave measurement on a target surface, information on other two dimensions is added for an optimization process; and proportions of shock wave propagation in incident laser energy and mechanical stress propagation in a target can be intuitively recognized according to the measured shock wave intensity and stress wave intensity, so that the blind debugging of the parameter is avoided, and the scientificity and persuasiveness of an optimization result are improved.

The present disclosure has the characteristics of simultaneity, simple structure, and low cost. Compared with traditional laser diagnosis technologies such as laser shadowing, schlieren and interference diagnosis in which an optical path structure is complex and there may be risks of interfering with the original LIBS system and failing to realize simultaneous detection, and an image diagnosis technology in which imaging devices on which the image diagnosis technology depends are high in price, the present disclosure has the advantages that prices of the piezoelectric ultrasonic transducers required by the present disclosure are usually within ten thousand yuan; it can be ensured that the main test configuration of LIBS is not affected, and at the same time, the simultaneous measurement of a spectral signal, a stress wave and a shock wave can be realized by only adding the piezoelectric ultrasonic transducers; and after the optimization of the spectral enhancement measure or system parameter is completed, subsequent formal LIBS analysis processes can be performed by removing the diagnosis devices, and therefore, the practicability is higher in engineering.

BRIEF DESCRIPTION OF DRAWINGS

In order to describe the technical solutions in the embodiments of the present disclosure more clearly, the accompanying drawings required for describing the embodiments will be briefly introduced below. It should be understood that the following accompanying drawings show only some embodiments of the present disclosure so as not to be regarded as limitations on a scope, and those of ordinary skill in the art may still derive other accompanying drawings from these accompanying drawings without creative efforts.

DESCRIPTION OF EMBODIMENTS

Figure 1:
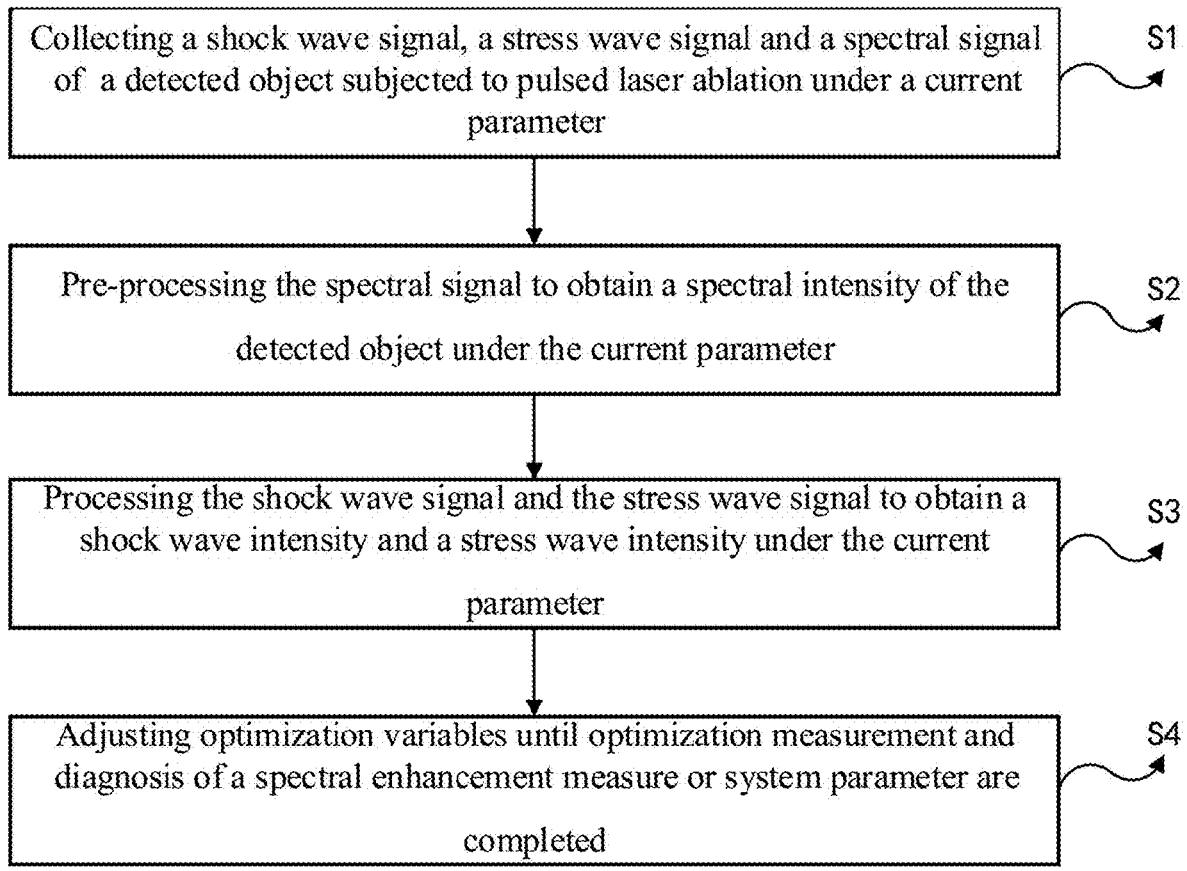
FIG. 1 shows a flow diagram of a method in the present disclosure.

In order to make objectives, technical solutions and advantages of the embodiments of the present disclosure clearer, the technical solutions in the embodiments of the present disclosure will be described clearly and completely below in conjunction with the accompanying drawings in the embodiments of the present disclosure. Apparently, the described embodiments are a part of the embodiments of the present disclosure, not all the embodiments. Generally, assemblies in the embodiments of the present disclosure described and shown in the accompanying drawings described herein may be arranged and designed according to various different configurations.

Therefore, the following detailed description in the embodiments of the present disclosure provided in the accompanying drawings is only intended to represent selected embodiments of the present disclosure, rather than to limit the scope required to be protected in the present disclosure. Based on the embodiments of the present disclosure, all other embodiments obtained by those of ordinary skill in the art without creative efforts shall fall within the protection scope of the present disclosure.

It should be noted that similar numerals and letters represent similar items in the following accompanying drawings, and therefore, once a certain item is defined in one of the accompanying drawings, it is unnecessary to further define and explain the item in the subsequent accompanying drawings.

In the description in the embodiments of the present disclosure, it should be noted that directional or positional relationships indicated by terms such as "upper", "lower", "horizontal" and "inner" are directional or positional relationships based on the accompanying drawings or directional or positional relationships usually put when the product in the present disclosure is used, are only intended to facilitate describing the present disclosure and simplifying the description, rather than to indicate or imply that the appointed device or element has to be located in a specific direction or structured and operated in the specific direction so as not to be understood as restrictions on the present disclosure. In addition, terms such as "first" and "second" are only for distinguishing the description, and cannot be understood as indicating or implying the relative importance.

In addition, if the term "horizontal" appears, it does not mean that a component is required to be absolutely horizontal, but can be tilted slightly. For example, "horizontal" only means that its direction is more horizontal than "vertical", but does not mean that the structure must be completely horizontal, but it can be tilted slightly.

In the description in the embodiments of the present disclosure, it should be further noted that terms such as "disposed", "mounted", "connected" and "connection" should be understood in a broad sense unless explicitly specified and defined otherwise. For example, connection may be fixed connection or detachable connection, or integral connection, may be mechanical connection or electrical connection, may be direct connection or indirect connection via an intermediate medium, and may be internal communication of two elements. For those of ordinary skill in the art, the specific meanings of the above-mentioned terms in the present disclosure may be understood according to specific situations.

Below, the present disclosure will be further described in detail in conjunction with the accompanying drawings:

Referring to FIG. 1, the present disclosure discloses a stress and shock wave diagnosis fused LIBS optimization method, including the following steps:

S1, a shock wave signal, a stress wave signal and a spectral signal of a detected object subjected to pulsed laser ablation under the current parameter are collected; specifically, a first piezoelectric ultrasonic transducer $A_1$ is fixed on a position, away from an ablation point for a distance x, over a target surface of the detected object, and a shock wave signal $\Phi_1$ is laterally collected; a second piezoelectric ultrasonic transducer $A_2$ is fixed on a position, away from the ablation point for a distance y, on the target surface, and a stress wave signal $\Phi_2$ propagating along the target surface is measured; then, the first piezoelectric ultrasonic transducer $A_1$ and the second piezoelectric ultrasonic transducer $A_2$ are connected to an oscilloscope; waveforms of the shock wave signal $\Phi_1$ and the stress wave signal $\Phi_2$ obtained after continuous N-pulse ablation under each parameter are recorded by the oscilloscope; and a spectral signal $\Phi_3$ of a target element is measured by a spectrometer.

S2, the spectral signal is pre-processed to obtain a spectral intensity of the detected object under the current parameter; specifically, a total peak intensity $E_{31,j}$, a net peak intensity $E_{32,j}$ and a net area intensity $E_{33,j}$ of the spectral signal $\Phi_3$ are calculated; and an average value of the total peak intensity $E_{31,j}$, the net peak intensity $E_{32,j}$ or the net area intensity $E_{33,j}$ is calculated as a spectral intensity index $E_3$ under the current parameter value:

$$E_3 = (\Sigma_{j=1}^{N} E_{3,j})/N$$

wherein $E_{3,j}$ is a spectral line intensity, measured under a $j^{th}$ pulse, of the target element, and the spectral line intensity $E_{3,j}$ of the target element may be any one of the total peak intensity $E_{31,j}$, the net peak intensity $E_{32,j}$ and the net area intensity $E_{33,j}$.

S3, the shock wave signal and the stress wave signal are processed to obtain a shock wave intensity and a stress wave intensity under the current parameter; specifically, an area where an appearing first peak is located is selected as a subsequent shock wave analysis area $\Phi'[t]_{1,j}$ from a shock wave signal $\Phi_{1,j}$ measured under the $j^{th}$ pulse in continuous N pulses, wherein j=1,2, ..., N; firstly, a shock wave background baseline value $\Phi_{1B,j}$ is subtracted from the shock wave analysis area $\Phi'[t]_{1,j}$, next, the shock wave analysis area $\Phi'[t]_{1,j}$ is squared, and then, an integration is performed on the shock wave analysis area $\Phi'[t]_{1,j}$ within a time range to obtain the shock wave intensity $E_{1,j}$ under the $j^{th}$ pulse; and a wave intensity $E_1$ under the current parameter is calculated:

$$E_1 = (\Sigma_{j=1}^{N} E_{1,j})/N$$

wherein $E_{1,j}$ represents a shock wave intensity under the $j^{th}$ pulse; and an area where an appearing first peak is located is selected as a subsequent stress wave analysis area $\Phi'[t]_{2,j}$ from a stress wave signal $\Phi_{2,j}$ measured under the $j^{th}$ pulse in continuous N pulses, wherein j=1,2, ..., N; firstly, a stress wave background baseline value $\Phi_{2B,j}$ is subtracted from the stress wave analysis area $\Phi'[t]_{2,j}$, next, the stress wave analysis area $\Phi'[t]_{2,j}$ is squared, and then, an integration is performed on the stress wave analysis area $\Phi'[t]_{2,j}$ within a time range to obtain the stress wave intensity $E_{2,j}$ under the $j^{th}$ pulse; and a stress wave intensity $E_2$ under the current parameter is calculated:

$$E_2 = (\Sigma_{j=1}^{N} E_{2,j})/N$$

wherein $E_{2,j}$ represents a stress wave intensity under the $j^{th}$ pulse.

S4, optimization variables are adjusted until optimization measurement and diagnosis of a spectral enhancement measure or system parameter are completed. Specifically, an initial optimization interval [a, b] of an optimization variable A is selected, wherein a is the minimum value of the optimization variable A, and b is the maximum value of the optimization variable A; a total of n groups of optimization values are uniformly set, then, a shock wave intensity measured in an $i^{th}$ test is set as $(E_1)_i$, a stress wave intensity measured in the $i^{th}$ test is set as $(E_2)_i$, a spectral intensity measured in the $i^{th}$ test is set as $(E_3)_i$, and a value $S_i$ of the optimization variable A in the $i^{th}$ test is set as:

$$S_i = a + (b-a) \times (i-1)/(n-1)$$

wherein i=1,2, ..., n; and a test is started from i=1, if $(E_3)_2$ measured in a second test is greater than or equal to $(E_3)_1$ measured in a first test, $(E_1)_2 \geq (E_1)_1$, and at the same time, $(E_2)_2 \geq (E_2)_1$, i is further increased with a step length which is 1; or else, an optimization interval is downwards or upwards replaced with [c, a] or [b, d], wherein c<a, and b<d; comparison is started again from i=1 until $(E_3)_{i+1}$ measured in an $(i+1)^{th}$ test is smaller than $(E_3)_i$ measured in the $i^{th}$ test, $(E_1)_{i+1} < (E_1)_i$, and at the same time, $(E_2)_{i+1} < (E_2)_i$, and then, $S_i$ set during the $i^{th}$ test is determined as an optimal value of the optimization variable A.

Figure 2:
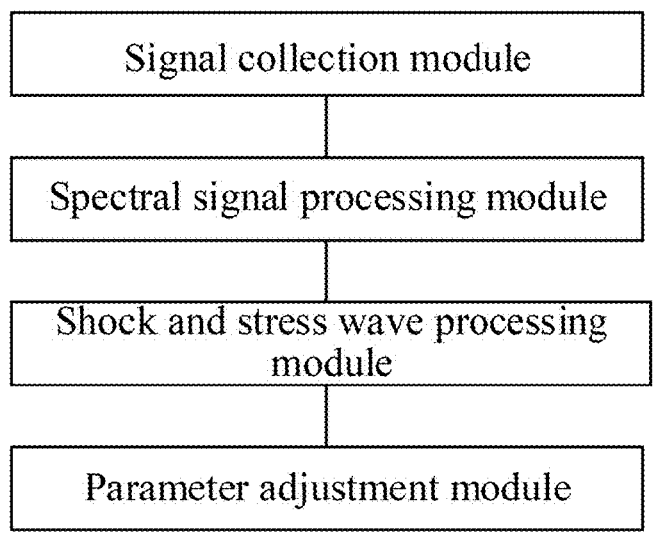
FIG. 2 shows a schematic diagram of a system in the present disclosure.

As shown in FIG. 2, an embodiment of the present disclosure discloses a stress and shock wave diagnosis fused LIBS optimization system, including:

A signal collection module configured to collect a shock wave signal, a stress wave signal and a spectral signal of a detected object subjected to pulsed laser ablation under the current parameter;

a spectral signal processing module configured to pre-process the spectral signal to obtain a spectral intensity of the detected object under the current parameter;

a shock and stress wave processing module configured to process the shock wave signal and the stress wave signal to obtain a shock wave intensity and a stress wave intensity under the current parameter; and a parameter adjustment module configured to adjust optimization variables until optimization measurement and diagnosis of a spectral enhancement measure or system parameter are completed.

Embodiments

Figure 3:
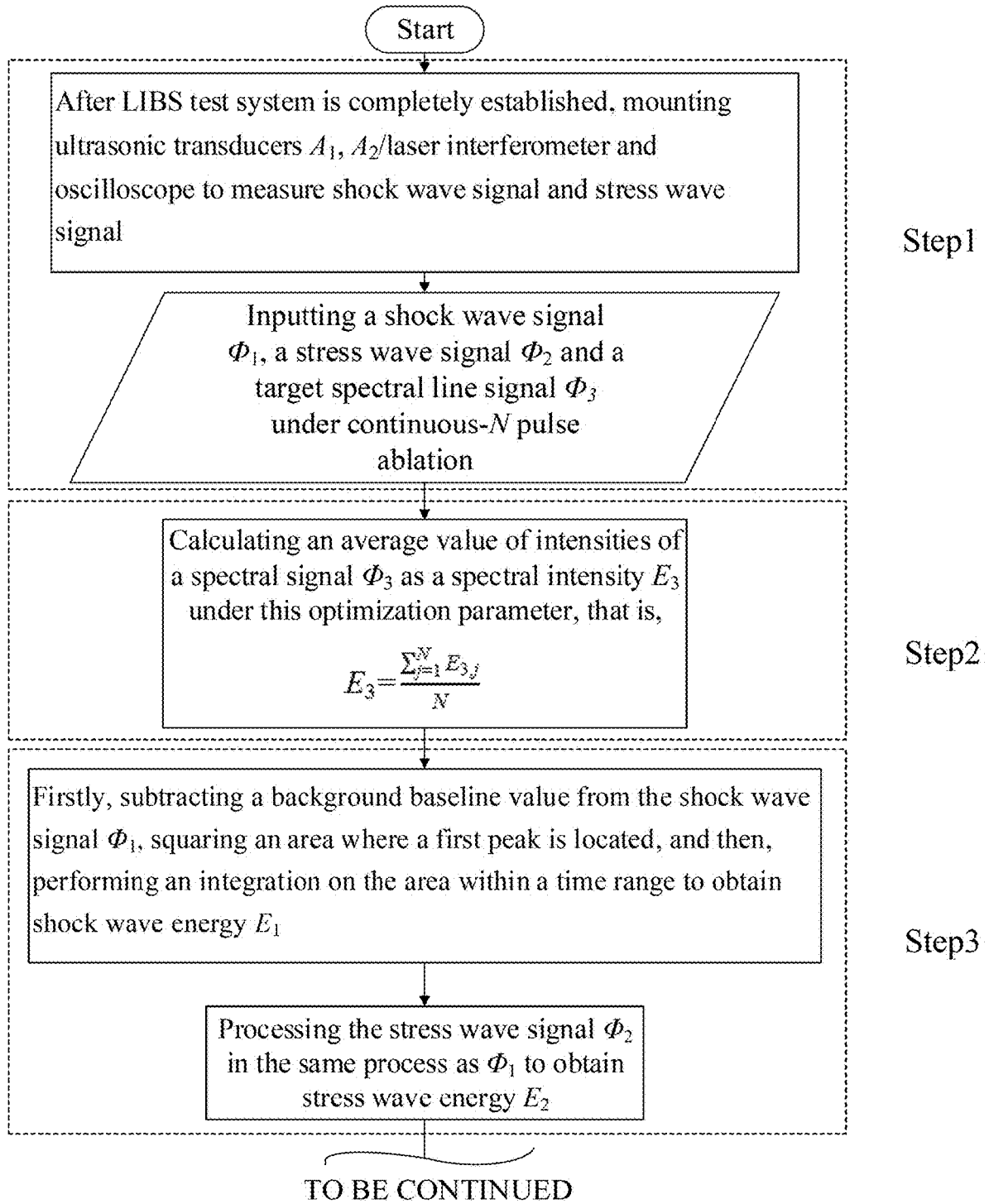
FIG. 3 shows a flow diagram of an embodiment of the present disclosure.
Figure 3:
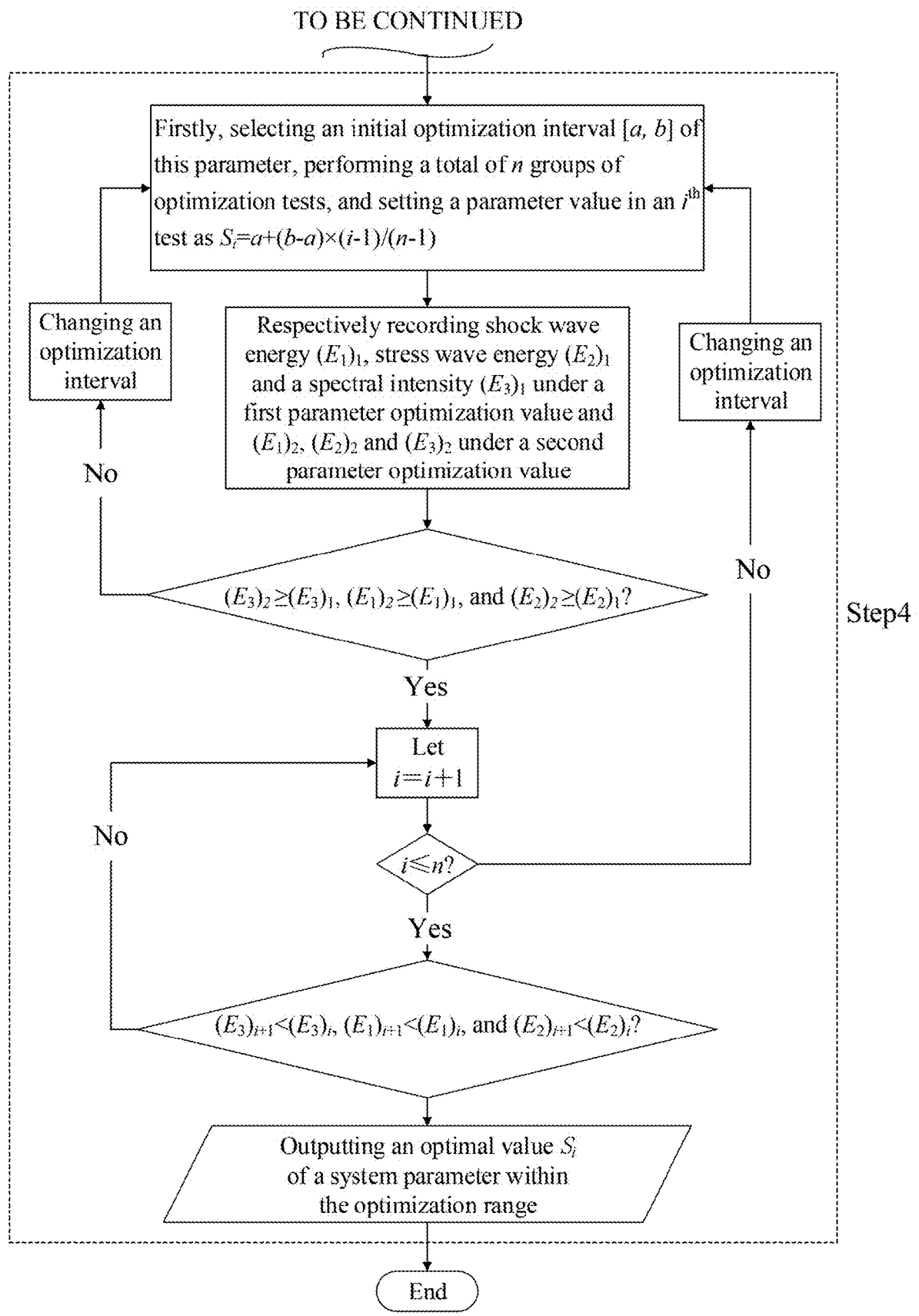

As shown in FIG. 3, an embodiment of the present disclosure discloses a stress and shock wave diagnosis fused LIBS optimization method, including the following steps:

Step 1, firstly, after a LIBS test system is completely established, a first piezoelectric ultrasonic transducer $A_1$ is fixed on a position, away from an ablation point for a distance x, over a target surface of the detected object, and a shock wave signal $\Phi_1$ is laterally collected; a second piezoelectric ultrasonic transducer $A_2$ is fixed on a position, away from the ablation point for a distance y, on the target surface, and a stress wave signal $\Phi_2$ propagating along the target surface is measured; and then, the first piezoelectric ultrasonic transducer $A_1$ and the second piezoelectric ultrasonic transducer $A_2$ are connected to an oscilloscope. When a certain specific spectral enhancement measure or system parameter is optimized, waveforms of the shock wave signal $\Phi_1$ and the stress wave signal $\Phi_2$ obtained after continuous N-pulse ablation under each parameter are recorded by the oscilloscope, a spectral signal $\Phi_3$ of a target element is measured by a spectrometer, and then, step 2 is performed for pre-processing the spectral signal $\Phi_3$.

Step 2, a total peak intensity $E_{31,j}$, a net peak intensity $E_{32,j}$ and a net area intensity $E_{33,j}$ of the spectral signal $\Phi_3$ measured under continuous N pulses are calculated. Optionally, an average value of one of index intensities is calculated as a spectral intensity index $E_3$ under this parameter value, that is, $E_{3,j}$ is a spectral line intensity, measured under $j^{th}$ pulse, of the target element. Next, step 3 is performed for processing the shock wave signal and the stress wave signal.

Step 3, an area where an appearing first peak is located is selected as a subsequent shock wave analysis area $\Phi'[t]_{1,j}$ from a shock wave signal $\Phi_{1,j}$ measured under the $j^{th}$ pulse in continuous N pulses, wherein j=1,2, . . . , N; firstly, a shock wave background baseline value $\Phi_{1B,j}$ is subtracted from the shock wave analysis area $\Phi'[t]_{1,j}$; next, the shock wave analysis area $\Phi'[t]_{1,j}$ is squared, then, an integration is performed on the shock wave analysis area $\Phi'[t]_{1,j}$ within a time range to obtain the shock wave intensity $E_{1,j}$ under the $j^{th}$ pulse, and finally, an average value of shock wave intensities under the N pulses is calculated as a shock wave intensity $E_1$ under this parameter value, that is, the stress wave signal $\Phi_2$ is processed by using the same method to obtain a stress wave intensity $E_2$ under this parameter value. Next, step 4 is performed for specifically optimizing the spectral enhancement measure or system parameter.

Step 4, for specifically optimizing the spectral enhancement measure or system parameter, firstly, an initial optimization interval [a, b] of an optimization variable A is selected, wherein a is the minimum value of the optimization variable A, and b is the maximum value of the optimization variable A; a total of n groups of optimization values are uniformly set, then, a value $S_i$ of the optimization variable A in the $i^{th}$ test is set as: $S_i=a+(b-a)\times(i-1)/(n-1)$, a shock wave intensity measured in the $i^{th}$ test is set as $(E_1)_i$, a stress wave intensity measured in the $i^{th}$ test is set as $(E_2)_i$, and a spectral intensity measured in the $i^{th}$ test is set as $(E_3)_i$, wherein i=1,2, . . . , n. A test is started from i=1, if $(E_3)_2$ measured in a second test is greater than or equal to $(E_3)_1$ measured in a first test, $(E_1)_2 \geq (E_1)_1$, and at the same time, $(E_2)_2 \geq (E_2)_1$, i is further increased with a step length which is 1; or else, an optimization interval is downwards or upwards replaced with [c, a] or [b, d], wherein c<a, and b<d; comparison is started again from i=1 until $(E_3)_{i+1}$ measured in an $(i+1)^{th}$ test is smaller than $(E_3)_i$ measured in the $i^{th}$ test, $(E_1)_{i+1}<(E_1)_i$, and at the same time, $(E_2)_{i+1}<(E_2)_i$, and then, $S_i$ set during the $i^{th}$ test is determined as an optimal value of the optimization variable A. So far, the optimization measurement and diagnosis of a spectral enhancement measure or system parameter A are completed.

Bandwidths of the first piezoelectric ultrasonic transducer $A_1$ for measuring a shock wave and the second piezoelectric ultrasonic transducer $A_2$ for measuring a stress wave are selected according to the following conditions.

It is assumed that the ideal rise time of the measured shock wave is $t_{shock}$ (unit: second), the bandwidth of the first piezoelectric ultrasonic transducer $A_1$ for measuring the shock wave should not be smaller than $(3-5)/t_{shock}$ (unit: Hertz), or the rise time of the first piezoelectric ultrasonic transducer $A_1$ should not be greater than $t_{shock}/(3-5)$ (unit: second). It is assumed that a pulse width of a laser beam used in the established LIBS system is $\tau_{laser}$, the bandwidth of the second piezoelectric ultrasonic transducer $A_2$ for measuring the stress wave should not be smaller than $(3-5)/\tau_{laser}$ (unit: Hertz). It is assumed that upper limits of available ranges of the first piezoelectric ultrasonic transducer $A_1$ and the second piezoelectric ultrasonic transducer $A_2$ are respectively $ML_1$ and $ML_2$, the mounting distances x and y of the first piezoelectric ultrasonic transducer $A_1$ and the second piezoelectric ultrasonic transducer $A_2$ should make respective actual measurement values satisfy $L_1 \in (0.5ML_1, ML_1)$ and $L_2 \in (0.5ML_2, ML_2)$. In a case that the second piezoelectric ultrasonic transducer $A_2$ cannot be mounted, due to the over small size of the target, on the surface where the target is ablated, the second piezoelectric ultrasonic transducer $A_2$ can be mounted on a back surface where the target is ablated, so as to be coaxial with the position of the ablation point. The upper limit N of pulses continuously shooting the target at the same ablation point can be adjusted without significantly causing a deepening effect, that is, it is assumed that the spectral intensity measured by a first pulse at the same ablation point is $(E_3)_1$, the spectral intensity measured under an $N^{th}$ pulse satisfies $(E_3)_N \in (0.95(E_3)_1, 1.05(E_3)_1)$.

As shown in FIG. 3 to FIG. 7, an optimization effect on a lens-to-sample distance in a process that the present disclosure is applied to nanosecond pulsed laser ablation of a steel target is described.

A Nd:YAG laser (DAWA-100) with a pulse width of 10 ns, a wavelength of 1064 nm, laser energy of 28 mJ/pulse and a repetition frequency of 1 Hz is used. A focusing lens adopts a cylindrical lens (LJ1703L1, Thorlabs) with a focal length of 75 mm. A target is a stainless steel target of 10 cm×10 cm×7 cm, and the surface of the target is polished in sequence by using 500-mesh, 1000-mesh, 1500-mesh and 2000-mesh sandpapers and is cleaned and wiped with anhydrous ethanol. An ultrasonic transducer (PCB113B26) for detecting the shock wave signal is mounted on a position, away from the ablation point for a distance x=1 cm, over the steel target, and is inclined to the vertical direction for 60 DEG, with an induction end surface facing the ablation point. A transducer (a surface wave probe, No. 21030256) for detecting the stress wave signal is adhered to a surface of the steel target by a coupling agent (Sonotech), and is away from the ablation point for a distance y=2.5 cm, with an induction end surface facing the ablation point. The two ultrasonic transducers are connected to an oscilloscope and are used to record the stress wave signal and the shock wave signal at different lens-to-sample distances. A spectrometer (LTB, Aryelle Butterfly) with a detectable wavelength range of 270-690 nm is adopted to record an emission spectral intensity. A position near the focus of the cylindrical lens is set as the lens-to-sample distance which is 0 mm, and a range from −3 mm to 2 mm is initially selected as an optimization interval of the lens-to-sample distance. With 0.5 mm as a step length, a total of 11 groups of lens-to-sample distances are set. The target is repeatedly shot for 5 times at each lens-to-sample distance, and average values of spectral intensities, shock wave intensities and stress wave intensities measured by 5 shots are taken as their respective reference values at the lens-to-sample distance.

Figure 4:
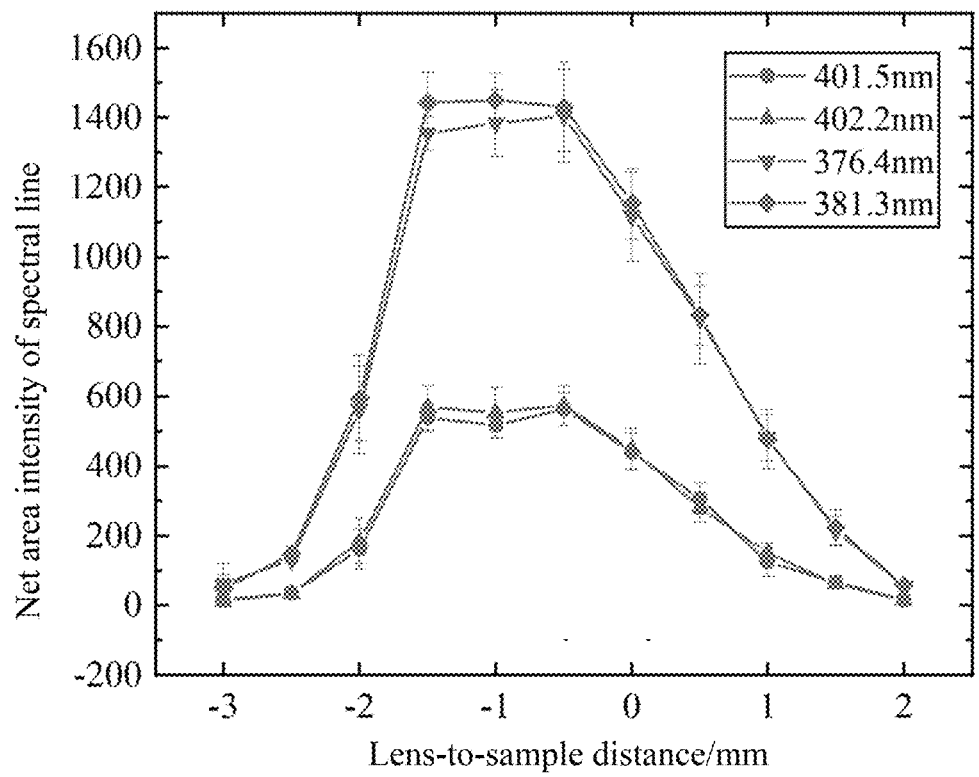
FIG. 4 shows the variation of measured net area intensities of four spectral lines of Fe I with a lens-to-sample distance when the present application is applied to the optimization of the lens-to-sample distance.
Figure 5:
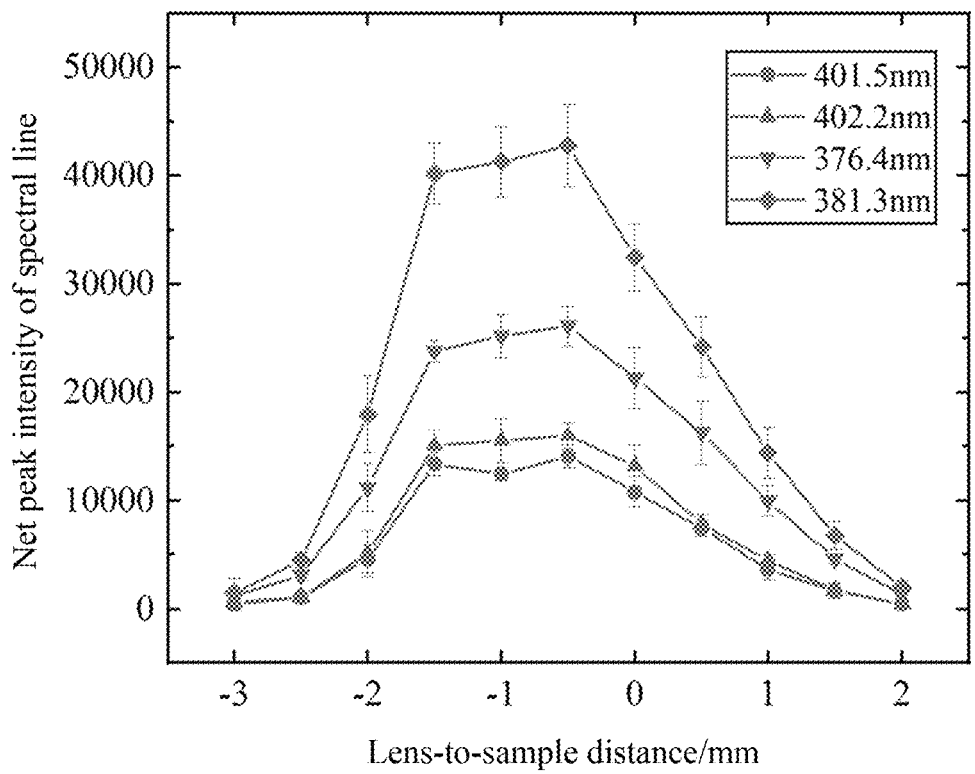
FIG. 5 shows the variation of measured net peak intensities of four spectral lines of Fe I with a lens-to-sample distance when the present application is applied to the optimization of the lens-to-sample distance.
Figure 6:
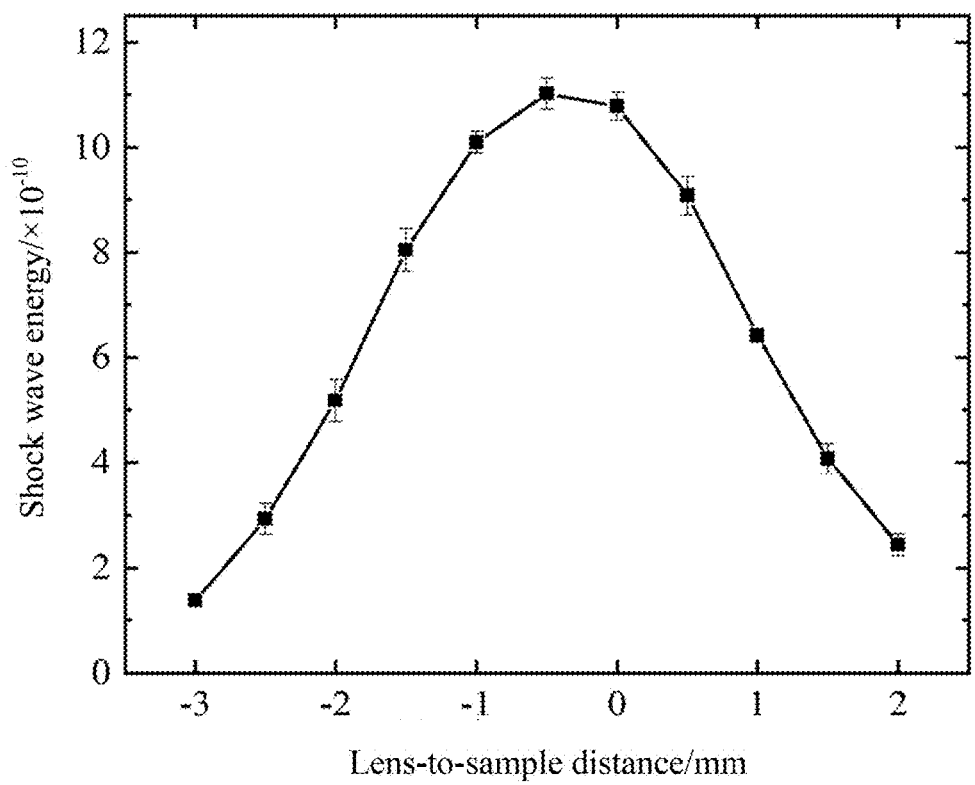
FIG. 6 shows the variation of measured shock wave intensities with a lens-to-sample distance when the present application is applied to the optimization of the lens-to-sample distance.
Figure 7:
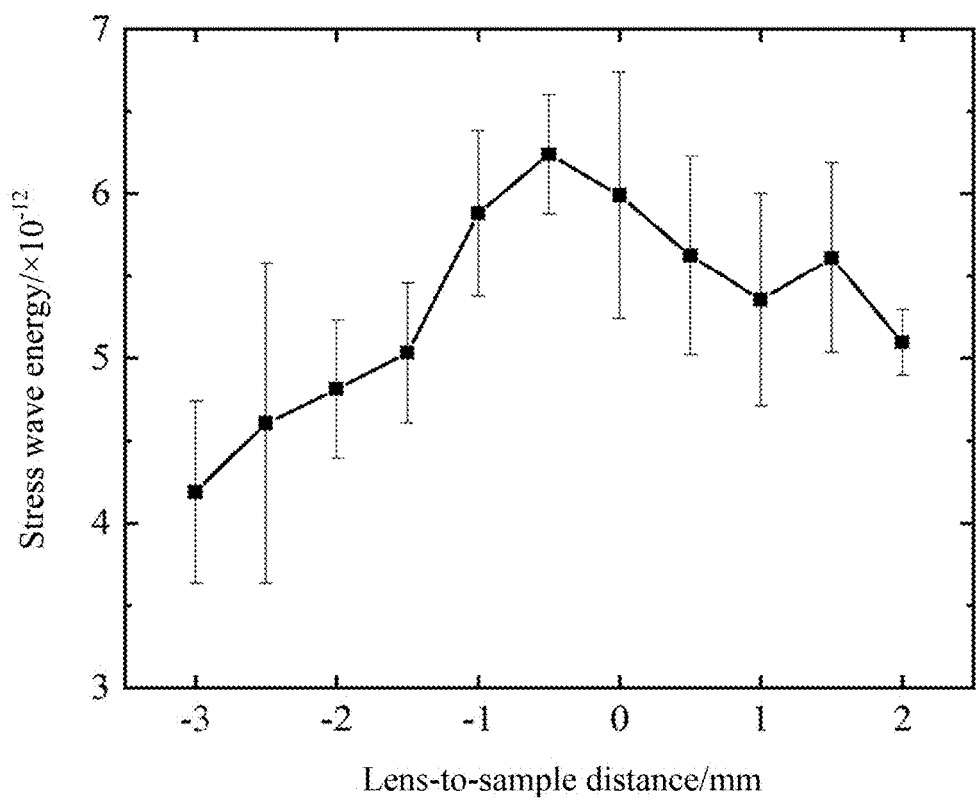
FIG. 7 shows the variation of measured stress wave intensities with a lens-to-sample distance when the present application is applied to the optimization of the lens-to-sample distance.

With four spectral lines (376.4 nm, 381.3 nm, 401.5 nm, and 402.2 nm) of Fe I within a detectable range of the spectrometer as examples, variations of the net area intensities and the net peak intensities of the four spectral lines with a lens-to-sample distance are respectively shown in FIG. 4 and FIG. 5. It can be seen that, when the lens-to-sample distance ranges from −1.5 mm to −0.5 mm, the net area intensities and the net peak intensities of the measured four spectral lines are relatively close to each other, and thus, the optimal lens-to-sample distance cannot be determined. FIG. 6 and FIG. 7 respectively show the variation of measured shock wave intensities and stress wave intensities with a lens-to-sample distance. It can be seen from FIG. 6 and FIG. 7 that both of shock wave energy and stress wave energy reach the maximum value when the lens-to-sample distance is −0.5 mm, which indicates that the optimal lens-to-sample distance should be −0.5 mm. It is proven that the single spectral intensity is not enough to determine the optimal value of the lens-to-sample distance in the optimization of the lens-to-sample distance in this test. The optimal value of the lens-to-sample distance can be helped to be diagnosed in combination with the measurement of the shock wave intensities and the stress wave intensities.

The above-mentioned embodiments are only preferred embodiments of the present disclosure, but are not intended to limit the present disclosure. For the skilled in the art, various alterations and changes may be made on the present disclosure. Any modifications, equivalent substitutions, improvements, etc. made within the spirit and principle of the present disclosure shall fall within the protection scope of the present disclosure.

What is claimed is:

1. A stress and shock wave diagnosis fused LIBS optimization method, comprising the steps of:
    collecting a shock wave signal, a stress wave signal and a spectral signal of a detected object subjected to pulsed laser ablation under a current parameter, wherein the step of collecting the shock wave signal, the stress wave signal and the spectral signal of the detected object subjected to pulsed laser ablation under the current parameter comprises:
    fixing a first piezoelectric ultrasonic transducer $A_1$ on a position, away from an ablation point for a distance x, over a target surface of the detected object, and laterally collecting a shock wave signal $\Phi_1$; fixing a second piezoelectric ultrasonic transducer $A_2$ on a position, away from the ablation point for a distance y, on the target surface, and measuring a stress wave signal $\Phi_2$ propagating along the target surface; then, connecting the first piezoelectric ultrasonic transducer $A_1$ and the second piezoelectric ultrasonic transducer $A_2$ to an oscilloscope, wherein x is a mounting distance of the first piezoelectric ultrasonic transducer $A_1$, and y is a mounting distance of the second piezoelectric ultrasonic transducer $A_2$; recording, by the oscilloscope, waveforms of the shock wave signal $\Phi_1$ and the stress wave signal $\Phi_2$ obtained after continuous N-pulse ablation under each parameter; and measuring a spectral signal $\Phi_3$ of a target element by a spectrometer;
    pre-processing the spectral signal to obtain a spectral intensity of the detected object under the current parameter;
    processing the shock wave signal and the stress wave signal to obtain a shock wave intensity and a stress wave intensity under the current parameter; and
    adjusting optimization variables until optimization measurement and diagnosis of a spectral enhancement measure or system parameter are completed, wherein the step of adjusting optimization variables until optimization measurement and diagnosis of the spectral enhancement measure or system parameter are completed comprises:
    selecting an initial optimization interval [a, b] of an optimization variable A, wherein a is the minimum value of the optimization variable A, and b is the maximum value of the optimization variable A; uniformly setting a total of n groups of optimization values, then, setting a shock wave intensity measured in an $i^{th}$ test as $(E_1)_i$, setting a stress wave intensity measured in the $i^{th}$ test as $(E_2)_i$, setting a spectral intensity measured in the $i^{th}$ test as $(E_3)_i$, and setting a value $S_i$ of the optimization variable A in the $i^{th}$ test as:

$$S_i=a+(b-a)\times(i-1)/(n-1),$$

wherein i=1,2, . . . n; and
starting a test from i=1, when $(E_3)_2$ measured in a second test is greater than or equal to $(E_3)_1$ measured in a first test, $(E_1)_2 \geq (E_1)_1$, and at the same time, $(E_2)_2 \geq (E_2)_1$, further increasing i with a step length of 1; or else, downwards or upwards replacing an optimization interval with [c, a] or [b, d], wherein c<a, and b<d; starting comparison again from i=1 until $(E_3)_{i+1}$ measured in an $(i+1)^{th}$ test is smaller than $(E_3)_i$ measured in the $i^{th}$ test, $(E_1)_{j+1} < (E_1)_i$, and at the same time, $(E_2)_{i+1} < (E_2)_i$, and then, determining $S_i$ set during the $i^{th}$ test as an optimal value of the optimization variable A.

2. The stress and shock wave diagnosis fused LIBS optimization method according to claim 1, wherein the mounting distance x of the first piezoelectric ultrasonic transducer $A_1$ and the mounting distance y of the second piezoelectric ultrasonic transducer $A_2$ satisfy the following conditions:
    the mounting distance x of the first piezoelectric ultrasonic transducer $A_1$ makes an actual measurement value thereof satisfy $L_1 \in (0.5ML_1, ML_1)$;
    the mounting distance y of the second piezoelectric ultrasonic transducer $A_2$ makes an actual measurement value thereof satisfy $L_2 \in (0.5ML_2, ML_2)$;
    wherein $ML_1$ is an upper limit of an available range of the first piezoelectric ultrasonic transducer $A_1$, and $ML_2$ is an upper limit of an available range of the second piezoelectric ultrasonic transducer $A_2$.

3. The stress and shock wave diagnosis fused LIBS optimization method according to claim 1, wherein the step of pre-processing the spectral signal to obtain the spectral intensity of the detected object under the current parameter comprises:
    calculating a total peak intensity $E_{31,j}$, a net peak intensity $E_{32,j}$ and a net area intensity $E_{33,j}$ of the spectral signal $\Phi_3$; and calculating an average value of the total peak intensity $E_{31,j}$, the net peak intensity $E_{32,j}$ or the net area intensity $E_{33,j}$ as a spectral intensity index $E_3$ under the current parameter value:

$$E_3 = \left(\sum_{j=1}^{N} E_{3,j}\right)/N,$$

where $E_{3,j}$ is a spectral line intensity, measured under a $j^{th}$ pulse, of the target element.

4. The stress and shock wave diagnosis fused LIBS optimization method according to claim 3, wherein the step of processing the shock wave signal and the stress wave signal to obtain the shock wave intensity and the stress wave intensity under the current parameter comprises:
    calculating a shock wave intensity $E_1$ under the current parameter:

$$E_1 = \left(\sum_{j=1}^{N} E_{1,j}\right)/N,$$

where $E_{1,j}$ represents a shock wave intensity under the $j^{th}$ pulse; and calculating a stress wave intensity $E_2$ under the current parameter:

$$E_2 = \left(\sum_{j=1}^{N} E_{2,j}\right)/N,$$

where $E_{2,j}$ represents a stress wave intensity under the $j^{th}$ pulse.

5. The stress and shock wave diagnosis fused LIBS optimization method according to claim 4, wherein the shock wave intensity $E_{1,j}$ under the $j^{th}$ pulse is obtained according to the method of:

selecting, from a shock wave signal $\Phi_{1,j}$ measured under the $j^{th}$ pulse in continuous N pulses, an area where an appearing first peak is located as a subsequent shock wave analysis area $\Phi'[t]_{1,j}$, wherein j=1,2, . . . , N; firstly, subtracting a shock wave background baseline value $\Phi_{1B,j}$ from the shock wave analysis area $\Phi'[t]_{1,j}$, next, squaring the shock wave analysis area $\Phi'[t]_{1,j}$, and then, performing an integration on the shock wave analysis area $\Phi'[t]_{1,j}$ within a time range to obtain the shock wave intensity $E_{1,j}$ under the $j^{th}$ pulse.

6. The stress and shock wave diagnosis fused LIBS optimization method according to claim 4, wherein the stress wave intensity $E_{2,j}$ under the $j^{th}$ pulse is obtained according to the method of:

selecting, from a stress wave signal $\Phi_{2,j}$ measured under the $j^{th}$ pulse in continuous N pulses, an area where an appearing first peak is located as a subsequent stress wave analysis area $\Phi'[t]_{2,j}$, wherein j=1,2, . . . , N; firstly, subtracting a stress wave background baseline value $\Phi_{2B,j}$ from the stress wave analysis area $\Phi'[t]_{2,j}$, next, squaring the stress wave analysis area $\Phi'[t]_{2,j}$, and then, performing an integration on the stress wave analysis area $\Phi'[t]_{2,j}$ within a time range to obtain the stress wave intensity $E_{2,j}$ under the $j^{th}$ pulse.

7. A stress and shock wave diagnosis fused LIBS optimization system, comprising:

a signal collection module configured to collect a shock wave signal, a stress wave signal and a spectral signal of a detected object subjected to pulsed laser ablation under a current parameter, wherein the signal collection module is configured to fix a first piezoelectric ultrasonic transducer $A_1$ on a position, away from an ablation point for a distance x, over a target surface of the detected object, and laterally collecting a shock wave signal $\Phi_1$; fix a second piezoelectric ultrasonic transducer $A_2$ on a position, away from the ablation point for a distance y, on the target surface, and measure a stress wave signal $\Phi_2$ propagating along the target surface; then, connect the first piezoelectric ultrasonic transducer $A_1$ and the second piezoelectric ultrasonic transducer $A_2$ to an oscilloscope, wherein x is a mounting distance of the first piezoelectric ultrasonic transducer $A_1$, and y is a mounting distance of the second piezoelectric ultrasonic transducer $A_2$; record, by the oscilloscope, waveforms of the shock wave signal $\Phi_1$ and the stress wave signal $\Phi_2$ obtained after continuous N-pulse ablation under each parameter; and measure a spectral signal $\Phi_3$ of a target element by a spectrometer;

a spectral signal processing module configured to preprocess the spectral signal to obtain a spectral intensity of the detected object under the current parameter;

a shock and stress wave processing module configured to process the shock wave signal and the stress wave signal to obtain a shock wave intensity and a stress wave intensity under the current parameter; and a parameter adjustment module configured to adjust optimization variables until optimization measurement and diagnosis of a spectral enhancement measure or system parameter are completed, wherein the parameter adjustment module is configured to select an initial optimization interval [a, b] of an optimization variable A, wherein a is the minimum value of the optimization variable A, and b is the maximum value of the optimization variable A; uniformly set a total of n groups of optimization values, then, set a shock wave intensity measured in an $i^{th}$ test as $(E_1)_i$, set a stress wave intensity measured in the $i^{th}$ test as $(E_2)_i$, set a spectral intensity measured in the $i^{th}$ test as $(E_3)_i$, and set a value $S_i$ of the optimization variable A in the $i^{th}$ test as:

$$S_i = a + (b-a) \times (i-1)/(n-1),$$

wherein i=1,2, . . . n; and start a test from i=1, when $(E_3)_2$ measured in a second test is greater than or equal to $(E_3)_1$ measured in a first test, $(E_1)_2 \geq (E_1)_1$, and at the same time, $(E_2)_2 \geq (E_2)_1$, further increase i with a step length of 1; or else, downwards or upwards replace an optimization interval with [c, a] or [b, d], wherein c<a, and b<d; start comparison again from i=1 until $(E_3)_{i+1}$ measured in an $(i+1)^{th}$ test is smaller than $(E_3)_i$ measured in the $i^{th}$ test, $(E_1)_{j+1} < (E_1)_j$, and at the same time, $(E_2)_{i+1} < (E_2)_i$, and then, determine $S_i$ set during the $i^{th}$ test as an optimal value of the optimization variable A.

\* \* \* \* \*